(12) United States Patent
Lovell et al.

(10) Patent No.: US 9,074,695 B2
(45) Date of Patent: Jul. 7, 2015

(54) VOLUME BOOSTER WITH DISCRETE CAPACITY ADJUSTMENT

(75) Inventors: Michel K. Lovell, Marshalltown, IA (US); Kenneth W. Junk, Marshalltown, IA (US); Ryan J. Jwanouskos, White Bear Lake, MN (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 662 days.

(21) Appl. No.: 13/209,696

(22) Filed: Aug. 15, 2011

(65) Prior Publication Data

US 2012/0060952 A1    Mar. 15, 2012

Related U.S. Application Data

(60) Provisional application No. 61/383,048, filed on Sep. 15, 2010.

(51) Int. Cl.
*F16K 11/07* (2006.01)
*F16K 11/04* (2006.01)
(Continued)

(52) U.S. Cl.
CPC ............. *F16K 11/04* (2013.01); *F15B 13/0405* (2013.01); *F15B 13/0433* (2013.01)

(58) Field of Classification Search
CPC ............... F15B 21/008; F15B 13/0433; F15B 13/0405; F15B 15/00; F15B 11/028; F15B 13/042; F15B 11/0426; F15B 11/044; F16K 47/08; F16K 11/04; F16K 31/1223; F16K 27/0263; F16K 11/048; F16K 31/1221; F16K 31/126; G05D 16/2093; G05D 3/18; G05D 16/2053; B23K 11/314

USPC ................. 137/596.14, 596.18, 84, 596, 102, 137/625.66; 91/274, 450, 463, 465; 251/50, 251/51, 53, 55
See application file for complete search history.

(56) References Cited

U.S. PATENT DOCUMENTS 3,529,628 A * 9/1970 Cummins .................. 137/625.3
3,692,054 A    9/1972 Buls et al.
(Continued)

FOREIGN PATENT DOCUMENTS

CN    1942675 A    4/2007
DE    26 41 761 A1    9/1977
(Continued)

OTHER PUBLICATIONS

International Search Report for PCT/US2011/051422, mailed Dec. 28, 2011.
(Continued)

*Primary Examiner* — Craig Schneider
*Assistant Examiner* — Craig J Price
(74) *Attorney, Agent, or Firm* — Marshall, Gerstein & Borun LLP

(57) ABSTRACT

A volume booster for an actuator system advantageously includes an adjustable restrictor, such that the exhaust capacity of the device can be adjusted for specific applications. The device comprises a body, a supply path, an exhaust path, and the restrictor. The supply path operates to provide a supply of fluid to boost a stroke time of an actuator in the actuator system, e.g., in an opening direction. The exhaust path operates to accommodate backpressure relief when the actuator system operates the actuator in a closing direction, for example. The restrictor is disposed within the exhaust path and is selectively manipulable between a plurality of positions to define a plurality of distinct exhaust capacities, thereby eliminating any requirement to change the entire volume booster to achieve a different exhaust capacity.

25 Claims, 6 Drawing Sheets

(51) Int. Cl.
*F15B 13/04* (2006.01)
*F15B 13/043* (2006.01)

(56) References Cited

U.S. PATENT DOCUMENTS

| | | | | |
|---|---|---|---|---|
| 3,899,001 | A * | 8/1975 | Orme | 137/625.3 |
| 4,109,683 | A | 8/1978 | Strache | |
| 4,183,375 | A * | 1/1980 | Vick | 137/625.3 |
| 4,249,574 | A * | 2/1981 | Schnall et al. | 137/625.3 |
| 4,554,948 | A * | 11/1985 | Bergmann | 137/625.31 |
| 4,757,884 | A * | 7/1988 | Fannin et al. | 137/614.19 |
| 4,813,339 | A | 3/1989 | Uno et al. | |
| 5,067,519 | A * | 11/1991 | Russell et al. | 137/107 |
| 5,901,749 | A | 5/1999 | Watson | |
| 6,003,428 | A | 12/1999 | Mundie et al. | |
| 6,517,006 | B1 * | 2/2003 | Knapp | 137/625.41 |
| 7,143,786 | B2 * | 12/2006 | Romero | 137/625.31 |
| 7,458,310 | B2 | 12/2008 | Junk | |
| 7,694,693 | B1 * | 4/2010 | Edelman et al. | 137/625.3 |
| 8,171,958 | B2 * | 5/2012 | Morreale | 137/625.39 |
| 8,631,826 | B2 * | 1/2014 | Lovell et al. | 137/625.66 |
| 8,689,832 | B2 * | 4/2014 | Lovell | 137/625.66 |

FOREIGN PATENT DOCUMENTS

| | | |
|---|---|---|
| DE | 31 40 318 A1 | 4/1983 |
| EP | 0 869 104 A1 | 10/1998 |
| GB | 153392 A | 11/1920 |
| GB | 2 016 168 A | 9/1979 |
| GB | 2 318 406 A | 4/1998 |
| WO | WO-95/12082 A1 | 5/1995 |
| WO | WO-2005/106256 A1 | 11/2005 |

OTHER PUBLICATIONS

Written Opinion for PCT/US2011/051422, mailed Dec. 28, 2012.
International Search Report and Written Opinion for Application No. PCT/US2011/051417, dated Dec. 28, 2011.
International Preliminary Report on Patentability for Application No. PCT/US2011/051417, dated Mar. 19, 2013.
International Preliminary Report on Patentability for Application No. PCT/US2011/051422, dated Mar. 19, 2013.
Instruction Manual, Form 5122, Aug. 2003, Type 2625 and 2625NS Volume Boosters.
Jack L. Johnson, P.E. "Matching valve and cylinder asymmetry," Hydraulics and Pneumatics, Sep. 2003.
Jack L. Johnson, P.E., "The final word on non-symmetrical valves," Hydraulics and Pneumatics, Oct. 2003.
Rudolph Muijtjens, "Praktisches Positionieren mit pneumatischen Linearantrieben," Olhydraulik und Pneumatik, (1998) No. 7., Mainz, DE.
International Serach Report and the Written Opinion for International Application No. PCT/US2005/012646, dated Aug. 4, 2005.
First Office Action for Chinese Application No. 201110274799.X, dated Dec. 22, 2014.
First Office Action for Chinese Application No. 201110274730.7 dated Dec. 22, 2014, 17 pages.

* cited by examiner

US 9,074,695 B2

VOLUME BOOSTER WITH DISCRETE CAPACITY ADJUSTMENT

CROSS-REFERENCE TO RELATED APPLICATIONS

The priority benefit of U.S. Provisional Patent Application No. 61/383,048, filed Sep. 15, 2010, is hereby claimed and the entire contents thereof are incorporated herein by reference.

FIELD OF THE DISCLOSURE present disclosure relates to fluid flow control systems, and more particularly, to volume flow boosters for enhancing control valve performance in fluid flow control systems.

BACKGROUND

Systems for controlling the flow of fluids, such as compressed air, natural gas, oil, propane, or the like, are generally known in the art. These systems often include at least one control valve for controlling various flow parameters of the fluid. Typical control valves include a control element such as a valve plug, for example, movably disposed within the flow path for controlling the flow of the fluid. The position of such a control element can be controlled by a positioner via a pneumatic actuator such as a piston actuator or a diaphragm-based actuator, as is known in the art. Conventional positioners deliver pneumatic signals to the actuator to stroke the control element of the control valve between an open and closed position, for example. The speed at which a standard positioner can stroke the control valve, however, partly depends on the sizes of the actuator and the control valve. For example, larger actuators/control valves typically take longer to be stroked.

Therefore, such systems additionally employ one or more volume boosters located between the positioner and the actuator. The volume boosters are used to amplify the volume of the pneumatic signal sent from the positioner, thereby increasing the speed at which the actuator strokes the control element of the control valve. Conventional volume boosters are offered in varying capacities such that a specific volume booster can be installed into a control system to suit a specific application. If the application changes, the volume booster can be switched out for a different volume booster having a different capacity.

SUMMARY OF THE DISCLOSURE

One embodiment of a fluid flow control device constructed in accordance with the principles of the present disclosure comprises a body, a supply path, an exhaust path, a supply port, a control element, a diaphragm assembly, and at least one restrictor. The body includes an inlet port, a common port, and a discharge port. The supply path extends between the inlet port and the common port. The exhaust path extends between the common port and the discharge port. The supply port is disposed within the body along the supply path between the inlet port and the common port. The control element is disposed within the body and adapted for displacement between a closed position in sealing engagement with the supply port to close the supply path, and an open position spaced from the supply port to open the supply path. The diaphragm assembly defines an exhaust port disposed along the exhaust path between the common port and the discharge port. The diaphragm assembly is adapted for displacement between a closed position, wherein the exhaust port is in sealing engagement with the control element to close the exhaust path, and an open position, wherein the exhaust port is spaced from the control element to open the exhaust path. The at least one restrictor is disposed within the body for restricting the flow of fluid along the exhaust path when the exhaust port is spaced from the control element. The at least one restrictor is selectively manipulable between a plurality of positions relative to the body to define a plurality of distinct exhaust capacities for the exhaust path.

DETAILED DESCRIPTION OF THE PREFERRED EMBODIMENTS

The examples, i.e., embodiments, described herein are not intended to be exhaustive or to limit the scope of the invention to the precise form or forms disclosed. Rather, the following description has been chosen to provide examples of the one or more preferred embodiments to those having ordinary skill in the art.

Figure 1:
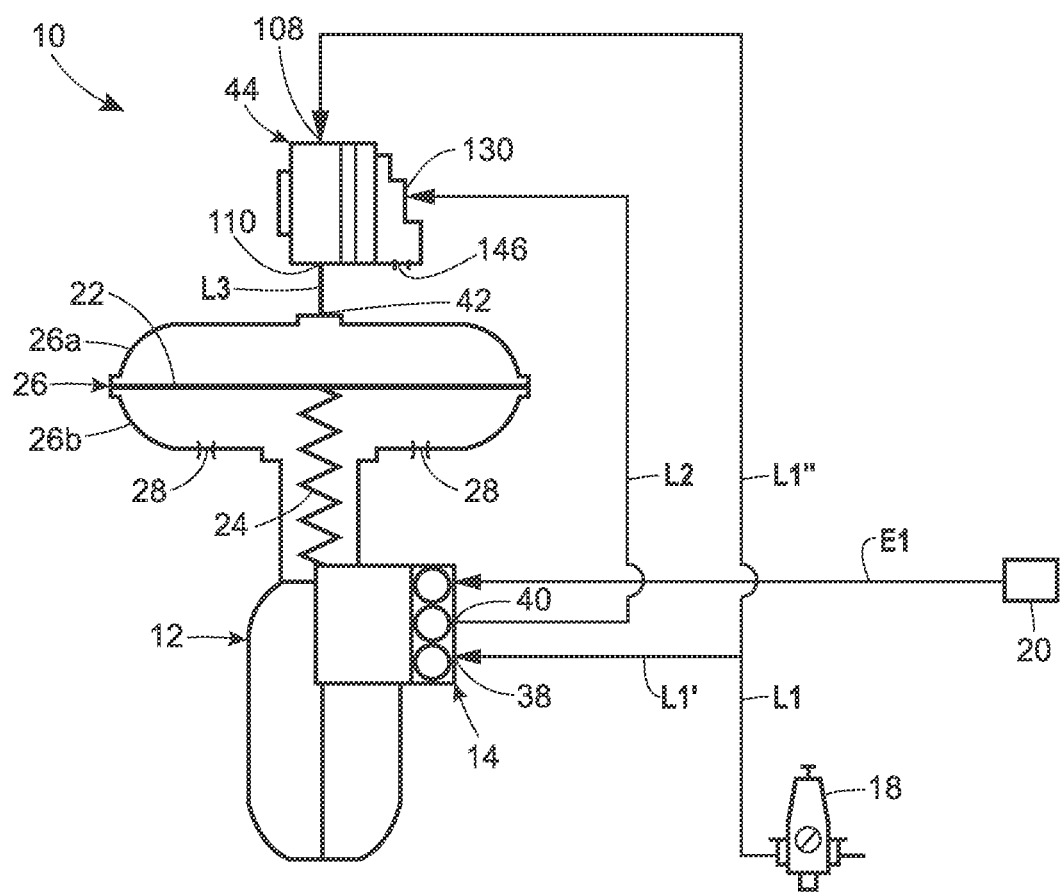
FIG. 1 is a schematic representation of a single-acting spring and diaphragm actuator assembly including a volume booster constructed in accordance with the principles of the present disclosure.

FIG. 1 provides a schematic representation of a single-acting spring and diaphragm actuator assembly 10 constructed in accordance with the principles of the present disclosure. Specifically, the actuator assembly 10 comprises an actuator 12, a positioner 14, a volume booster 44, a regulator 18, and a controller 20. The actuator 12 is adapted to be operably connected to a control valve (not shown) equipped with a movable control element for controlling the flow of a fluid through a system such as a fluid distribution or other fluid processing system, for example.

The volume booster 44 includes an inlet port 108, a common port 110, a control port 130, and a discharge port 146. The positioner 14 includes an inlet 38 and an outlet 40. The actuator 12 includes a booster communication port 42. The actuator 12, the positioner 14, the volume booster 44, and the regulator 18 communicate with each other via a plurality of fluid lines. Specifically, the regulator 18 is in fluid communication with the positioner 14 and the volume booster 44 via a supply line L1, which is split into a first supply line L1' and a second supply line L1". The outlet 40 of the positioner 14 is in fluid communication with the control port 130 of the volume booster 44 via an output signal line L2. The common port 110 of the volume booster 44 is in fluid communication with the booster communication port 42 of the actuator 12 via a control line L3.

As will be described in more detail, the first supply line L1' is adapted to deliver a supply pressure to the inlet 38 of the positioner 14 and the second supply line L1" is adapted to deliver a supply pressure to the inlet port 108 of the volume booster 44. The supply pressure can be provided to the supply line L1 via the regulator 18 from a pressure source such as a compressor, for example. Additionally, the positioner 14 is adapted to deliver a pneumatic control signal to the volume booster 44 via the output signal line L2 for controlling the operation of the actuator 12.

For example, based on an electrical signal received from the controller 20 via an electrical connection E1, the positioner 14 transmits a pneumatic signal to the control port 130 of the volume booster 44 via the output signal line L2. The pneumatic signal passes through the volume booster 44 to instruct the actuator 12 to actuate the control valve (not shown). Typically, the positioner 14 is adapted to generate a pneumatic signal of a relatively modest pressure. Therefore, depending on the size of the actuator 12 and/or the desired speed at which the actuator 12 is to stroke the control valve, the volume booster 44 can be activated to supplement the pneumatic signal with additional fluid sourced from the supply line L1, as will be described.

In the embodiment depicted in FIG. 1, the actuator 12 includes a fail-up actuator comprising a diaphragm 22 and a spring 24 contained within a diaphragm casing 26. The diaphragm 22 divides the casing 26 into a top cavity 26a and a bottom cavity 26b. The spring 24 is disposed in the bottom cavity 26b of the casing 26 and biases the diaphragm 22 upward. Therefore, when the positioner 14 sends a pneumatic signal to the volume booster 44 via the output signal line L2, pneumatic pressure is introduced into the top cavity 26a of the actuator 12 via the booster communication port 42, thereby moving the diaphragm 22 downward. This downward movement is then transferred into a corresponding movement of the control element of the associated control valve (not shown), as is understood within the art.

Preferably, the casing 26 includes one or more vents 28 such that fluid contained within the bottom cavity 26b vents out of the casing 26 when the diaphragm 22 moves downward. Such venting facilitates the movement of the diaphragm 22 in the downward direction. To stroke the actuator 12 upward, the positioner 14 stops sending the pneumatic signal or reduces the pressure of the pneumatic signal such that the spring 24 moves the diaphragm 22 upward. As the diaphragm 22 moves upward, the pressure built up in the upper cavity 26a of the casing 26 exhausts through the control line L3, to the volume booster 44, and out of the discharge port 148 to the atmosphere. This exhausting to the atmosphere facilitates the movement of the diaphragm 22 in the upward direction.

Figure 2:
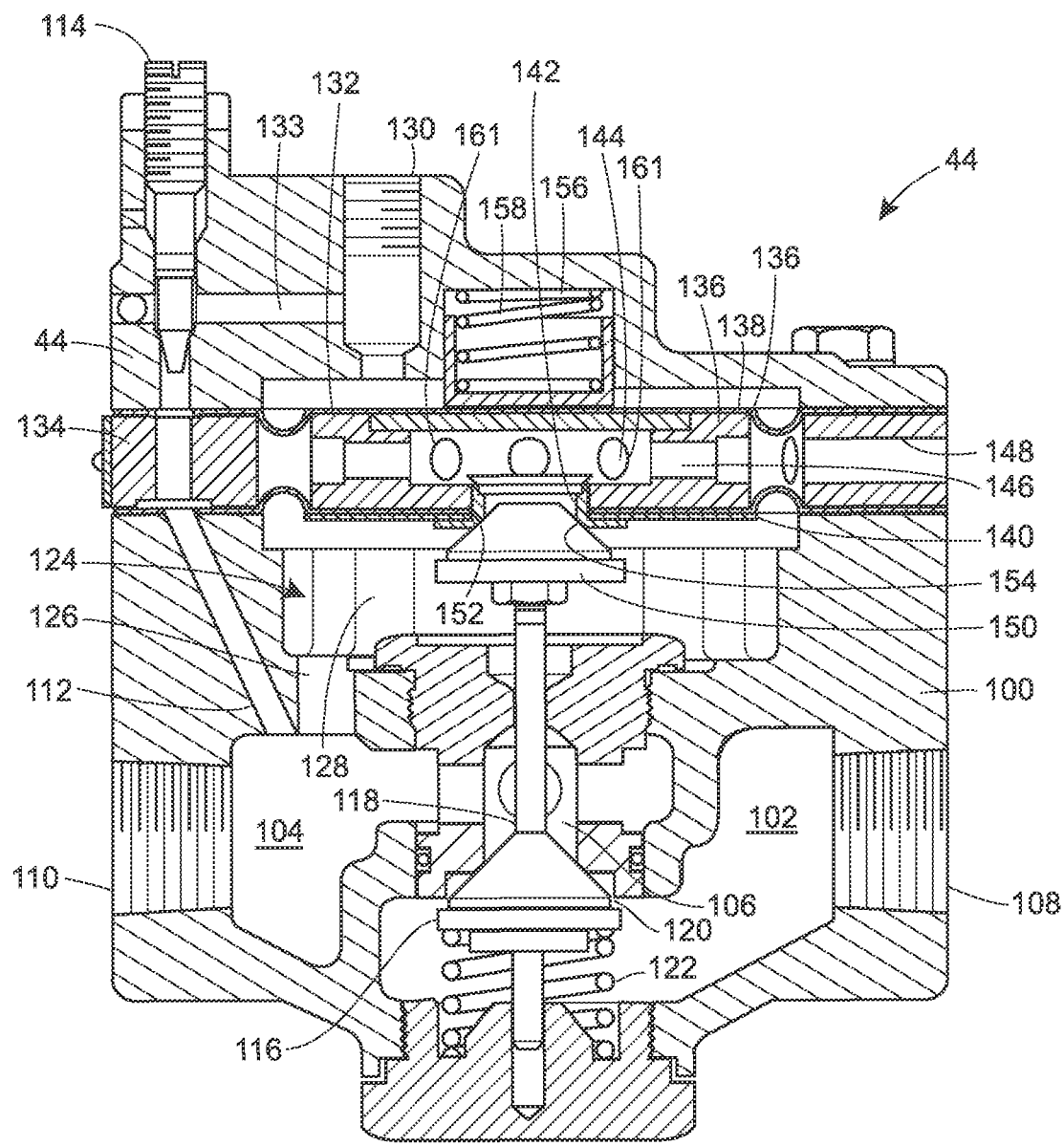
FIG. 2 is a side cross-sectional view of one embodiment of a volume booster constructed in accordance with the principles of the present disclosure.

With reference now to FIG. 2, one embodiment of the volume booster 44 constructed in accordance with the present invention will be described. The booster 44 can be constructed as a modified version of one of the volume boosters described in U.S. patent application Ser. No. 11/107,073, entitled "Asymmetric Volume Booster Arrangement for Valve Actuators," filed Apr. 15, 2005, the entire contents of which are hereby incorporated herein by reference. Nevertheless, the details will be described herein for completeness.

The booster 44 generally includes a body 100 having an inlet chamber 102 and a common chamber 104 in communication with one another via a supply port 106. The inlet chamber 102 includes the inlet port 108, which at one end that is open to the exterior of the body 100. The inlet chamber 102 is in communication with the supply port 106 at its interior end. The common chamber 104 communicates with the supply port 106 and opens to the exterior of the body 100 at the common port 110. The inlet chamber 102 and inlet port 108 are in communication with the regulator 18 in the example of FIG. 1 via the second supply line L1". The common chamber 104 is in communication with the actuator 12, via the control line L3.

A bypass restriction passage 112 is in communication with the common chamber 104 and has a bypass adjustment screw 114. The bypass adjustment screw 114 can be adjusted to permit small volumes of fluid to travel from the positioner 14, through the booster 44, and to the actuator 12, while avoiding implementation of a volume boost function of the volume booster 44. A larger pressure differential across the booster 44 will activate the booster 44, as will discussed below.

A supply valve 116 is positioned within the inlet chamber 102 adjacent the supply port 106. The supply valve 116 is carried in this example integrally, i.e., as one piece, on a portion of a stem 118 and is biased relatively tightly to a closed position against a seat 120 of the supply port 106 by a spring 122.

A cavity 124 is provided within the body above the inlet and common chambers 102 and 104 and the supply port 106 in this example. An exhaust passage 126 is provided in the body 100 to enable fluid communication between an exhaust chamber section 128 of the cavity 124 and the common chamber 104. The control port 130 of the booster 44 provides fluid communication between the output signal line L2 (shown in FIG. 1) from the positioner 14 and an upper signal chamber section 132 of the cavity 124.

A bypass port 133 provides fluid communication between the bypass passage 112 and the control port 130. Therefore, when the positioner 14 sends pressurized fluid to the booster 44 through the control port 130 to move the actuator 12, the fluid travels into the upper signal chamber 132 and through the bypass port 133. If the pressure of the fluid is not high enough to activate the booster 44, as will be described herein, the fluid only travels through the bypass port 133 and the bypass restriction passage 112, and into the common chamber 104. From there the fluid travels to the actuator 12. Of course, since the booster 44 has not been activated, moving the actuator 12 can take a comparatively long time.

To activate the booster 44, the booster 44 includes a floating diaphragm assembly 134 positioned within the cavity 124 and which separates the cavity 124 into the exhaust and signal chambers 128 and 132. The diaphragm assembly 134 includes a floating manifold 136 sandwiched between a pair of diaphragms 138 and 140. The manifold 136 includes a central opening 142 and a plurality of radial passages 144 extending radially outward from the central opening 142. In the disclosed embodiment, there are eight (8) radial passages 144, only five (5) of which are depicted in the cross-sectional representation of FIG. 2. The radial passages 144 are in fluid communication with an annular passage 146 extending around the manifold 136 between the diaphragms 138 and 140. The annular passage 146 is in further fluid communication with the discharge port 148, which vents to the atmosphere outside of the body 100.

An exhaust valve 150 is carried on the valve stem 118 opposite the supply valve 116. An exhaust port 152 is provided in the bottom of the manifold 136 and provides communication between the exhaust chamber section 128 of the cavity 124 and the central opening 142 of the manifold 136. The exhaust valve 150 bears against a seat 154 to close off the exhaust port 152. A spring cavity 156 is provided above the diaphragm assembly 134 and houses a spring 158 that biases the floating diaphragm assembly 134 downward against the exhaust valve 150 to close the exhaust port 152. When the exhaust valve 150 is closed, the exhaust chamber section 128 of the cavity 124 is not in communication with the discharge port 148. When open, the common chamber 104 of the booster 44 is in fluid communication with the discharge port 148 through the exhaust chamber section 128 and the diaphragm manifold 136, thereby defining an "exhaust path" of the volume booster 44.

In addition to the foregoing, the booster 44 includes one or more restrictors 161, which are illustrated in phantom in FIG. 2. The restrictors 161 are disposed within one or more of the radial passages 144 of the manifold 136 of the diaphragm assembly 134. The restrictors 161 comprise plugs such as ⅛" NPT pipe plugs completely sealing the corresponding radial passages 144 and preventing fluid from flowing therethrough. In the depicted embodiment, the one or more restrictors 161 include two restrictors 161 sealing two radial passages 144. It should be appreciated, however, that any number of the radial passages 144 could be filled with a restrictor 161 to achieve different capacities of flow through the manifold 136 during an exhaust process, as will be described.

During operation, to actuate the actuator 12 in the downward direction, the positioner 14 sends a pneumatic signal to the volume booster 44. Depending on the magnitude of the pressure of the pneumatic signal, the signal either actuates the actuator 12 by itself (as discussed above), or the signal activates the volume booster 44 and the signal is supplemented by fluid pressure supplied from the regulator 18, via the inlet port 108 of the booster 44.

For example, while the pressurized signal actuates the actuator 12, it is also provided to the signal chamber 132. For the sake of description, a pressure differential across the volume booster 44 is defined as a pressure differential occurring across the diaphragm assembly 134, i.e., between the signal chamber 132 and the exhaust chamber section 128 of the cavity 124. Because the exhaust chamber section 128 is in continuous fluid communication with the common chamber 104 of the body 100 (via the exhaust passage 126), it can also be said that a pressure differential across the volume booster 44 is defined as a pressure differential occurring between the signal chamber 132 and the common chamber 104.

If the pressure differential across the volume booster 44 is insubstantial, the supply valve 116 and the exhaust valve 150 remain in the closed positions, as depicted in FIG. 2. That is, the supply valve 116 sealingly engages the seat 120 of the supply port 106, and the exhaust valve 150 sealingly engages the seat 154 of the exhaust port 152. So disposed, the diaphragm assembly 134 stays in a static unloaded position. This position is also assisted by the spring 122 biasing the supply valve 116 into engagement with the supply port 106, and the spring 158 biasing the diaphragm assembly 134 into engagement with the exhaust valve 150. In this situation, the pneumatic signal sent through the volume booster 44 actuates the actuator 12 by itself, as discussed above.

In contrast, a substantial pressure differential across the volume booster 44 is one that is great enough to move the diaphragm assembly 134, whether up or down, relative to the orientation of the volume booster 44 depicted in FIG. 2.

During operation, a positive differential condition is achieved when pressure is substantially greater in the signal chamber 132 than in the exhaust chamber section 128 of the cavity 124 such as when the positioner 14 delivers a high pressure signal to the control port 130. This can occur when the controller 20 instructs the positioner 14 to stroke the actuator 12 in the downward direction, for example. The high pressure signal forces the floating diaphragm assembly 134 downward, which moves the supply and exhaust valves 116, 150 downward, thereby keeping the exhaust port 152 seated against the exhaust valve 150 and moving the supply valve 116 away from the seat 120 of the supply port 106. Thus, the volume booster 44 opens a "supply path," which provides a boost of fluid flow from the regulator 18 to the actuator 12 via the volume booster 44. Specifically, because the supply port 106 is open, fluid from the regulator 18 flows into the inlet chamber 102, through the supply port 106 and the common chamber 104, and to the actuator 12, via the common port 110. Again, because the common chamber 104 is also in constant fluid communication with the exhaust chamber section 128 of the cavity 124 via the exhaust passage 126, the pressure in the common chamber 104 also registers on the lower diaphragm 140 of the diaphragm assembly 134.

When the controller 20 instructs the positioner 14 to stroke the actuator 12 back upward, the positioner 14 may reduce the pressure of the pneumatic signal transmitted to the volume booster 44. This causes the pressure in the signal chamber 132 to reduce and equalize with the pressure in the common chamber 104. The diaphragm assembly 134 begins to rise, and the spring 122 biases the supply and exhaust valves 116, 150, which are fixed together via the stem 118, back upward such that the supply valve 116 reseats against the seat 102 of the supply port 106, thereby closing the "supply path."

Once the "supply path" is closed, the supply and exhaust valves 116, 150 cannot move further upward, but back pressure from the common chamber 104 moves the diaphragm assembly 134 further upward against the force of the spring 158. This moves the seat 154 carried by the diaphragm assembly 134 away from the exhaust valve 150 and opens the exhaust port 152. With the exhaust port 152 open, the volume booster 44 defines an "exhaust path" between the common chamber 104 and the discharge port 148. That is, pressurized fluid in the common chamber 104 travels to the exhaust chamber section 128 of the cavity 124 via the exhaust passages 126 in the body 100, then through the central opening 142 in the manifold 136, through the radial passages 144, and out of the discharge port 148 to the atmosphere. Once the pressure in the common chamber 104 equalizes with the force of the spring 158, the diaphragm assembly 134 moves back down and the seat 154 reseats against the exhaust valve 150 to close the "exhaust path."

As mentioned above, the bypass adjustment screw 114 can be adjusted so that different pressures from the positioner 14 will activate the volume booster 44, as just described. For example, if the bypass adjustment screw 114 nearly completely blocks communication between the control port 130 and the bypass restriction passage 112 to the common chamber 104, a relatively small pressure from the positioner 14 can activate the volume booster 44. This is because nearly all of the pressure transmitted by the positioner 14 will enter the signal chamber 132 and bear on the upper diaphragm 138, thereby forcing the diaphragm assembly 134 and the supply and exhaust valves 116, 150 downward to open the "supply path" by opening the supply port 106. In contrast, if the bypass adjustment screw 114 allows a large volume of fluid to flow through to the bypass restriction passage 112 and onto the common chamber 104, less fluid pressure will bear on the upper diaphragm 138 of the diaphragm assembly 134, and the volume booster 44 will only be activated under a comparatively higher pressure from the positioner 14.

Volume boosters of this type can generally be characterized as having an exhaust capacity and a supply capacity. The exhaust capacity can be described as the maximum volume of fluid capable of traveling along the "exhaust path," i.e., from the common chamber 104 to the discharge port 148 when the exhaust port 152 is open. The supply capacity can be described as the maximum volume of fluid capable of traveling along the "supply path," i.e., from the inlet chamber 102 to the common chamber 104 when the supply port 106 is open.

The exhaust capacity of the volume booster 44 depicted in FIG. 2 is, at least partly, dependent on the geometry and dimensions of the "exhaust path" such as the exhaust passage 126 in the body 100 and the radial passages 144 in the manifold 136. That is, the shape and size of the "exhaust path" impacts a fluid flow resistance of the "exhaust path," which in turn affects the capacity.

For example, the size and number of radial passages 144 in the manifold 136 contribute to a fluid flow resistance of the "exhaust path," which directly affects the capacity of the "exhaust path," i.e., the exhaust capacity. As mentioned above, the present embodiment of the volume booster 44 is described as including a manifold 136 with eight (8) radial passages 144, two (2) of which are sealed with restrictors 161, i.e., plugs. These restrictors 161 prevent fluid flowing along the "exhaust path" from flowing through those two (2) radial passages 144. Therefore, fluid only flows through six (6) of the eight (8) potential radial passages 144. To increase the exhaust capacity and decrease the fluid flow resistance of the manifold 136, and therefore, the "exhaust path," one or both of the restrictors 161 can be removed from the respective radial passages 144. In contrast, to decrease the exhaust capacity and increase the fluid flow resistance of the manifold 136, and therefore the "exhaust path," more than the two (2) radial passages 144 can be sealed with more restrictors 161. The effect of each restrictor 161 on the exhaust capacity and fluid flow resistance of the "exhaust path" is generally the same.

Therefore, it should be appreciated that the exhaust capacity and fluid flow resistance of the "exhaust path" of the volume booster 44 described herein can be increased or decreased as required for a particular application. These discrete adjustments can be made incrementally by adding or subtracting one or more restrictors 161. This advantageously enables the volume booster 44 to be easily adapted and used for a variety of applications having different operational requirements.

Figure 3:
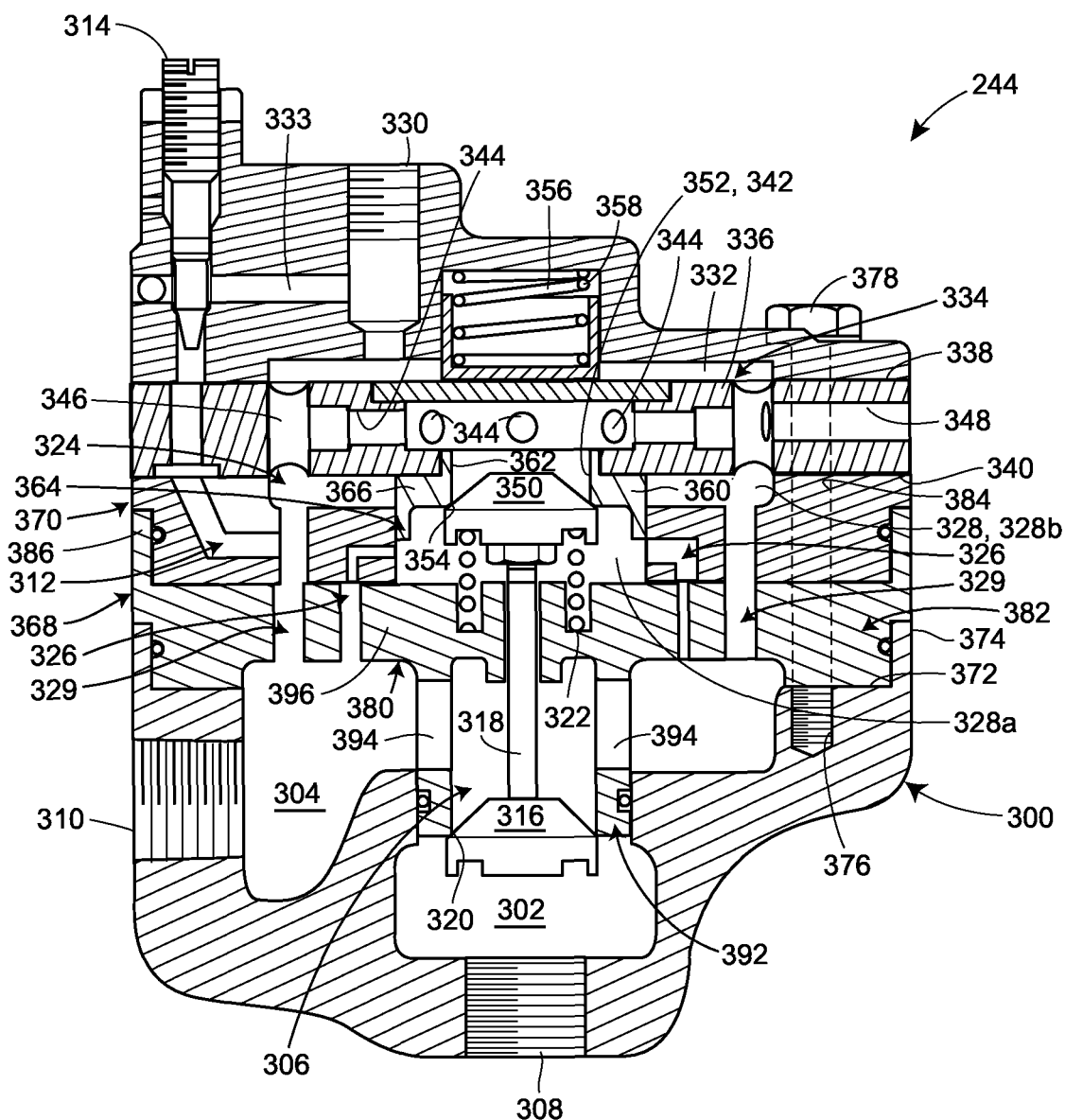
FIG. 3 is a side cross-sectional view of another embodiment of a volume booster constructed in accordance with the principles of the present disclosure.

FIG. 3 depicts an alternative volume booster 244 constructed in accordance with the present invention and capable of discrete exhaust capacity adjustment. The basic function of the volume booster 244 depicted in FIG. 3 is the same as that described above with reference to FIG. 2, and therefore, the same amount of detail will not be repeated. The structure is slightly different, however, and the following description will highlight these differences.

The volume booster 244 includes a body 300 having an inlet chamber 302 and a common chamber 304 in communication with one another via a supply port 306. The inlet chamber 302 includes an inlet port 308 at one end that is open to the exterior of the body 300. The inlet chamber 302 is in communication with the supply port 306 at its interior end. The common chamber 304 communicates with the supply port 306 and opens to the exterior of the body 300 at a common port 310. The volume booster 244 is adapted to be used in an actuator system such as the system described above with reference to FIG. 1, and therefore, the inlet chamber 302 and inlet port 308 are adapted to be coupled in fluid communication with the regulator 18 via the second supply line L1". Furthermore, the common chamber 304 is adapted to be coupled in fluid communication with the actuator 12, via the control line L3, as depicted in FIG. 1.

As illustrated in FIG. 3, the inlet port 308 and common port 310 of the volume booster 244 are disposed approximately ninety degrees (90°) from each other. So configured, the body 300 of the volume booster 244 can be referred to as an angled-style body. This type of body can lend to certain packaging advantages, but otherwise does not substantially affect the performance or function of the volume booster 244.

Still referring to FIG. 3, the body 300 additionally defines a bypass restriction passage 312 in fluid communication with the common chamber 304 and a control port 330. The bypass restriction passage 312 includes a bypass adjustment screw 314. The bypass adjustment screw 314 can be adjusted to permit different volumes of fluid to travel from the positioner 14 (shown in FIG. 1), through the booster 244, and to the actuator 12, with or without activating the booster 244, similar to that described above for the volume booster 44 depicted in FIG. 2.

A cavity 324 is provided within the body above the inlet and common chambers 302 and 304 and the supply port 306. Similar to the booster 44 described above, the cavity 324 of the volume booster 244 in FIG. 3 includes a signal chamber 332 and an exhaust chamber section 328. In this embodiment of the booster 244, a plurality of exhaust passages 326 are provided in constant fluid communication between the exhaust chamber section 328 of the cavity 324 and the common chamber 304. Additionally, in this embodiment, a plurality of registration passages 329 are provided in constant fluid communication between the exhaust chamber section 238 of the cavity 324 and the common chamber 304. In the present embodiment, the plurality of exhaust and registration passages 326, 329 include first through sixth exhaust and registration passages 326a-326f, 329a-329f, as will be further described below.

A bypass port 333 provides for fluid communication between the bypass passage 312 and the control port 330. Therefore, when the positioner 14 sends pressurized fluid to the booster 244 through the control port 330 to move the actuator 12, the fluid travels into the upper signal chamber 332 and through the bypass port 333. If the pressure of the fluid is not high enough to activate the booster 244, the fluid only travels through the bypass port 333 and the bypass restriction passage 312, and into the common chamber 304. From there the fluid travels to the actuator 12. Of course, since the booster 244 has not been activated, moving the actuator 12 can take a comparatively long time.

A supply valve 316 is positioned within the inlet chamber 302 adjacent the supply port 306. The supply valve 316 is carried in this example integrally, i.e., as one piece, on a portion of a stem 318 and is biased relatively tightly to a closed position against a seat 320 of the supply port 306 by a spring 322. An exhaust valve 350 is carried opposite the stem 318 from the supply valve 316. In this example, the spring 322 directly engages the exhaust valve 350 to seat the supply valve 316.

To activate the booster 244, the booster 244 further includes a floating diaphragm assembly 334 that is generally identical to the floating diaphragm assembly 134 described above with reference to the volume booster 44 described above in FIG. 2.

One distinction, however, is that the volume booster 244 depicted in FIG. 3 includes an exhaust port 352 equipped with a seat ring 360. The seat ring 360 includes an inner cylindrical member 362, an outer cylindrical member 364, and a radial member 366 extending between the inner and outer cylindrical members 362, 364. The inner and outer cylindrical members 362, 364 are axially offset from each other. The radial member 366 defines a seat 354 for being engaged by the exhaust valve 350, as depicted in FIG. 3. The inner cylindrical member 362 is fixed within a central opening 342 of a manifold 336 of the diaphragm assembly 334 such that the outer cylindrical member 364 extends away from the manifold 336 and around the exhaust valve 350 when the exhaust valve 350 is seated against the seat 354 to close the exhaust port 352, as illustrated in FIG. 3. This configuration provides certain functional advantages, that will be described below.

Still referring to FIG. 3, a spring cavity 356 is provided above the diaphragm assembly 334 and houses a spring 358 that biases the floating diaphragm assembly 334 downward against the exhaust valve 350 to close the exhaust port 352. When the exhaust valve 350 is closed, the exhaust chamber 328 is not in communication with the discharge port 348. When open, the common chamber 304 of the booster 244 is in fluid communication with the discharge port 348 through the exhaust chamber 328 and the diaphragm manifold 336 in generally the same manner as that described above with reference to the volume booster 244 depicted in FIG. 2.

Figure 4:
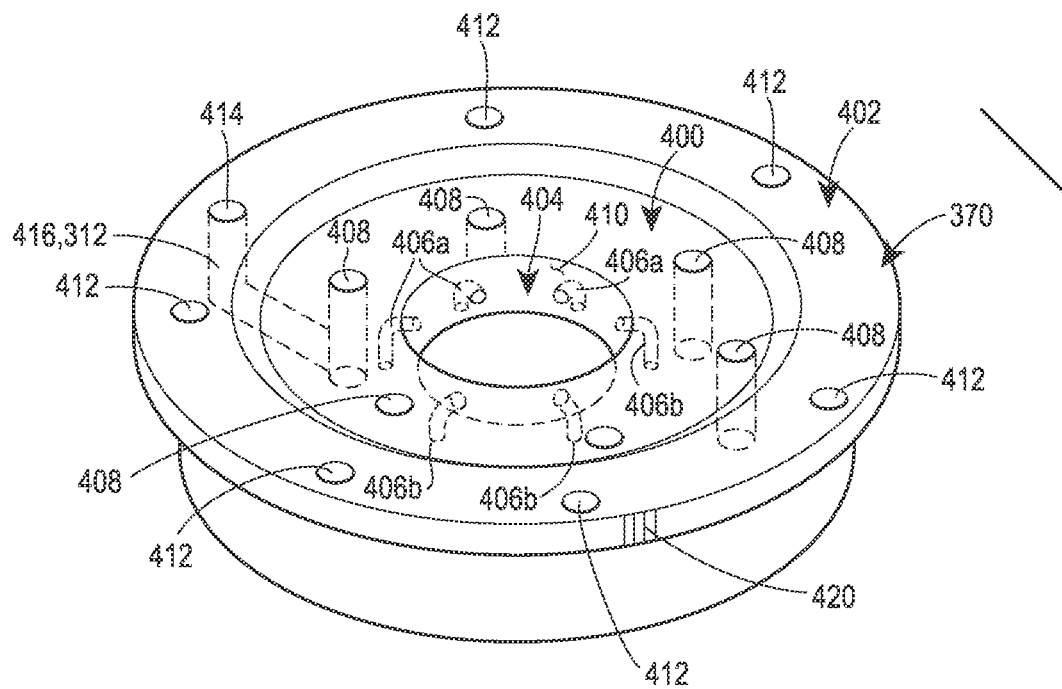
FIG. 4 is a perspective view of an exhaust control ring and trim cartridge of the volume booster of FIG. 3.
Figure 4:
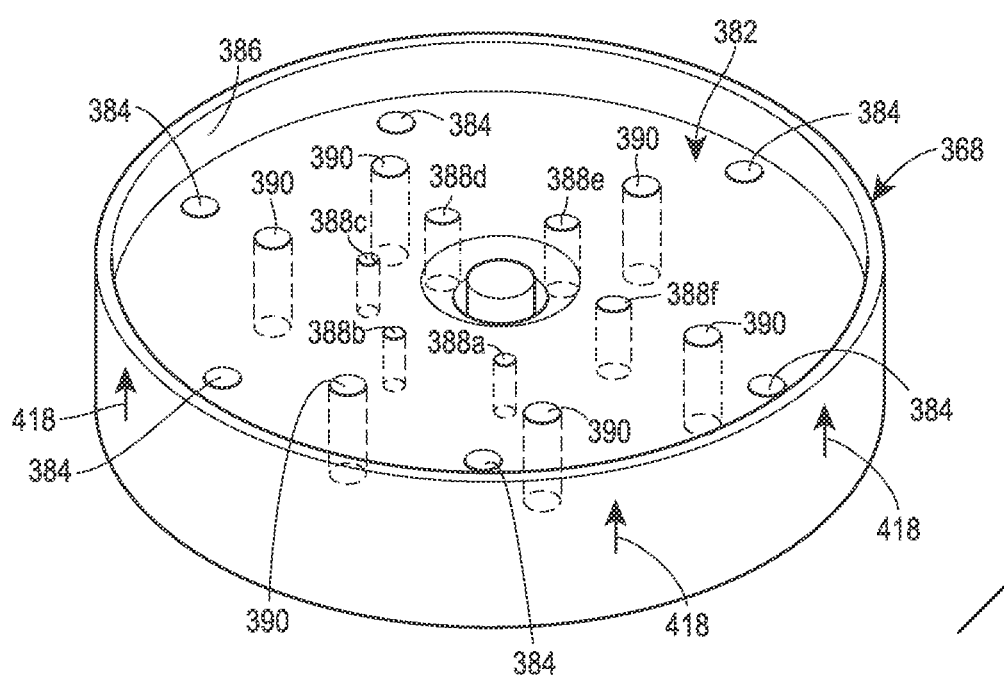

Unlike the volume booster 44 described above with reference to FIG. 2, however, the body 300 of the volume booster 244 depicted in FIG. 3 additionally includes a trim cartridge 368 and an exhaust control ring 370. FIG. 4 illustrates one embodiment of the trim cartridge 368 and exhaust control ring 370 in perspective view and removed from the volume booster 244.

The trim cartridge 368 includes a generally disc-shaped member adapted to be supported within the body 300 of the volume booster 244. More specifically, as shown in FIG. 3, the body 300 of the volume booster 244 includes a shelf portion 372 circumscribed by a flange portion 374. The shelf portion 372 circumscribes the common chamber 304 and includes a generally flat, ring-shaped, horizontal surface, relative to the orientation of the volume booster 244 depicted in FIG. 3. Additionally, a plurality of threaded bores 376 are provided in the shelf portion 372 for receiving threaded fasteners 378 for adjustably securing each of the components of the volume booster 244 together, as shown in FIG. 3. FIG. 3 only illustrates one (1) threaded bore 376 and one (1) threaded fastener 378 due to the cross-sectional depiction. However, in a preferred embodiment, the volume booster 244 includes six (6) bores 376 and six (6) fasteners 378.

Still referring to FIG. 3, the trim cartridge 368 is supported on the shelf portion 372 of the body 300 of the volume booster 244. The trim cartridge 368, as mentioned, is generally disc-shaped and includes a central portion 380 and a peripheral portion 382, as shown in FIG. 4. The peripheral portion 382 engages the shelf portion 372 of the body 300. Moreover, the peripheral portion 382 defines a plurality of bolt holes 384 (shown in FIGS. 3 and 4) extending therethrough for receiving the fasteners 378. The peripheral portion 382 further comprises a flange portion 386 circumscribing the trim cartridge 368 and extending upwardly therefrom.

As illustrated in FIG. 3, the central portion 380 of the trim cartridge comprises a cage portion 392 extending axially downwardly therefrom, and a spring seat 396 disposed above the cage portion 392. The spring seat 396 comprises an annular recess formed in the trim cartridge 368 for receiving the spring 322 that biases the supply valve 316, stem 318, and exhaust valve 350 into the position illustrated in FIG. 3, i.e., such that the supply valve 316 seats against the seat 320 of the supply port 306. The cage portion 392 comprises a generally cylindrical member defining a plurality of windows 394 and the valve seat 320 of the supply port 306. The windows 394 in the cage portion 392 are adapted to enable the flow of fluid through the body 300 from the inlet chamber 302 to the common chamber 304 along a "supply path" when the supply port 306 is open. The "supply path" is similar to the "supply path" of the booster 44 described above. That is, the "supply path" extends from the inlet port 308, through the inlet chamber 302, through the supply port 306, through the common chamber 304, and out the common port 310 when the supply port 306 is open.

With reference now to FIGS. 3 and 4, the central portion 380 of the trim cartridge 368 defines a plurality of exhaust entry passages 388 and a plurality of registration entry passages 390. Each of the exhaust and registration entry passages 388, 390 include cylindrical bores extending through the trim cartridge 368. In the disclosed embodiment, there are six (6) exhaust entry passages 388 equally spaced in a circle, and six (6) registration entry passages 390 equally spaced in a circle that circumscribes the exhaust entry passages 388. Each of the registration entry passages 390 have the same diameter.

For the sake of description, the plurality of exhaust entry passages 388 are divided into first through third sequentially spaced exhaust entry passages 388a-388c and fourth through sixth sequentially spaced exhaust entry passages 388d-388f. In the disclosed embodiment, the first through third exhaust entry passages 388a-388c have equal diameters, and the fourth through sixth exhaust entry passages 388d-388f have equal diameters. The diameters of the fourth through sixth exhaust entry passages 388d-388f are larger than the diameters of the first through third exhaust entry passages 388a-388c, as illustrated in FIG. 4.

Still referring to FIGS. 3 and 4, the exhaust control ring 370, as mentioned, also includes a generally disc-shaped member with a central portion 400 and a peripheral portion 402. The peripheral portion 402 defines a plurality of bolt holes 412 adapted to receive the fasteners 328 for securing the various components of the volume booster 244 together. Additionally, the peripheral portion 402 includes a bypass opening 414 that leads into a bypass bore 416. The bypass bore 416 defines the bypass passage 312 of the present embodiment of the volume booster 244, which was discussed above with reference to FIG. 3. More specifically, the bypass bore 416 comprises an elbowed conduit extending from the bypass opening 414 to one of six (6) registration exit passages 408, which will be described, in the central portion 400 of the exhaust control ring 370. So configured, the bypass bore 416, which serves as the bypass passage 312 of the volume booster 244, communicates between the control port 330 and the common chamber 304.

The central portion 400 defines a central opening 404, a plurality of exhaust exit passages 406, and the registration exit passages 408. The central opening 404 is defined by an internal cylindrical surface 410.

As shown in FIG. 4, the exhaust exit passages 406 include horizontal portions 406a and vertical portions 406b, which extend generally perpendicular to the horizontal portions 406a, thereby defining generally L-shaped exhaust exit passages 406. So configured, the horizontal portions 406a of the exhaust exit passages 406 exit the trim cartridge 368 through the internal cylindrical surface 410 of the central opening 404.

Similar to the exhaust and registration entry passages 388, 390 in the trim cartridge 368 described above, the present embodiment of the exhaust control ring 370 includes six (6) exhaust exit passages 406 equally spaced in a circle, and six (6) registration exit passages 408 equally spaced in a circle that circumscribes the exhaust entry passages 406. Each of the registration exit passages 408 have the same diameter, which is generally equal to the diameters of the registration entry passages 390 in the trim cartridge 368.

For the sake of description, the plurality of exhaust exit passages 406 are divided into first through third sequentially spaced exhaust exit passages 406a-406c and fourth through sixth sequentially spaced exhaust exit passages 406d-406f. In the disclosed embodiment, the first through third exhaust exit passages 406a-406c have equal diameters, and the fourth through sixth exhaust exit passages 406d-406f have equal diameters. The diameters of the fourth through sixth exhaust exit passages 406d-406f are larger than the diameters of the first through third exhaust exit passages 406a-406c, as illustrated in FIG. 4. Moreover, the diameters of the first through third exhaust exit passages 406a-406c are generally equal to the diameters of the first through third exhaust entry passages 388a-388c, and the diameters of the fourth through sixth exhaust exit passages 406d-406f are generally equal to the diameters of the fourth through sixth exhaust entry passages 388d-388f.

When the trim cartridge 368 and exhaust control ring 370 are assembled into the volume booster 244, the exhaust control ring 370 stacks on top of the trim cartridge 368, as depicted in FIG. 3. The exhaust control ring 370 must be positioned within the volume booster 244 such that the bypass opening 414 is aligned with the bypass adjustment screw 314. As will be described, however, the trim cartridge 368 can be positioned within the volume booster 244 below the exhaust control ring 370 in any one of a plurality of rotational positions, wherein each rotational position defines a distinct relationship between the exhaust entry passages 388 in the trim component 368 and the exhaust exit passages 406 in the exhaust control ring 370. The combination of one exhaust entry passage 388 and one exhaust exit passage 406 defines one exhaust passage 326. As such, the flow of fluid through the exhaust passages 326a-326f can be adjusted by adjusting the position of the trim cartridge 368 relative to the exhaust control ring 370.

For example, as is schematically depicted in FIGS. 5A-5D, the trim cartridge 368 can be positioned in at least four distinct positions, relative to the exhaust control ring 370. In FIGS. 5A-5D, the first through sixth exhaust entry passages 388a-388f are schematically illustrated in phantom lines and the first through sixth exhaust exit passages 406a-406f are schematically illustrated in solid lines. As in the actual volume booster 244 described above, the first through sixth exhaust exit passages 406a-406f are shown as being fixed in position in FIGS. 5A-5D.

Figure 5A:
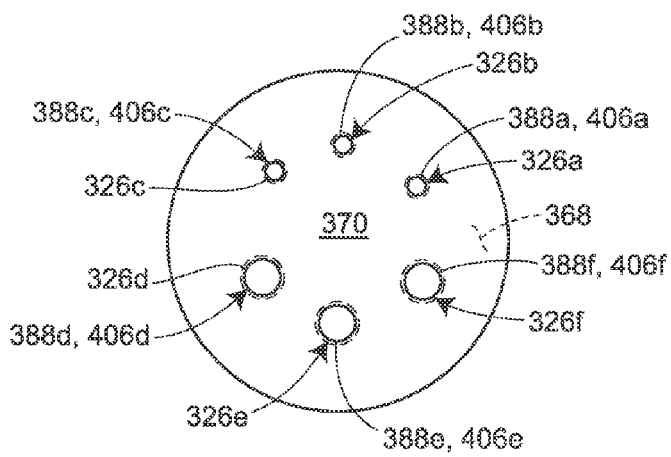
FIGS. 5A-5D are schematic plan views of four different operating configurations of the exhaust control ring and trim cartridge of FIGS. 3 and 4.

In FIG. 5A, the first through third exhaust entry passages 388a-388c are aligned with the first through third exhaust exit passages 406a-406c, and the fourth through sixth exhaust entry passages 388d-388f are aligned with the fourth through sixth exhaust exit passages 406d-406f. So configured, this arrangement provides for the maximum amount of volume of fluid to travel through the trim cartridge 368 and exhaust control ring 370 along the "exhaust path." For example, for the sake of description, it can be said that each of the first through third exhaust entry and exit passages 388a-388c, 406a-406c, i.e., the narrower passages, include a flow capacity of 0.5, and the fourth through sixth exhaust entry and exit passages 388d-388f, 406d-406f, i.e., the wider passages, include a flow capacity of 2.0. Moreover, it should be understood that the capacity of each of the first through sixth exhaust passages 326a-326f, which constitutes the combination of an exhaust entry passage 388 and an exhaust exit passage 406, is determined by the smaller capacity of the corresponding exhaust entry and exit passages 388, 406.

Thus, with the trim cartridge 368 positioned as illustrated in FIG. 5A, each of the first through third exhaust passages 326a-326c formed by the first through third exhaust entry and exit passages 388a-388c, 406a-406c has a capacity of 0.5, and each of the fourth through sixth exhaust passages 326d-326f formed by the fourth through sixth exhaust entry and exit passages 388d-388f, 406d-406f has a capacity of 2.0. Thus, the specific arrangement depicted in FIG. 5A has a total exhaust capacity of 7.5, which is the sum of the capacities of each of the first through sixth exhaust passages 326a-326f.

Figure 5B:
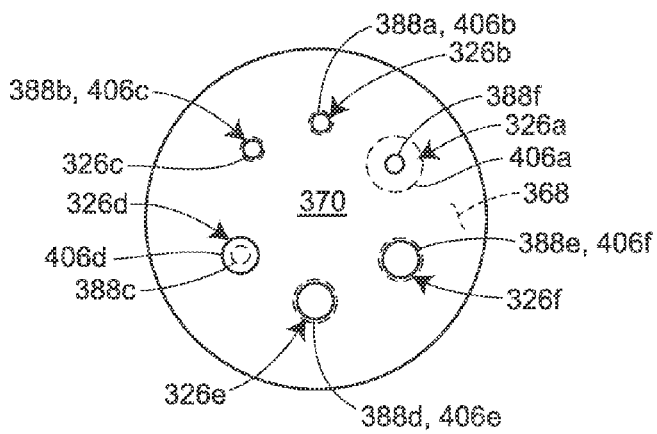

In FIG. 5B, the trim cartridge 368 has been rotated such that the first exhaust entry passage 388a is aligned with the second exhaust exit passage 406b; the second exhaust entry passage 388b is aligned with the third exhaust exit passage 406c; the third exhaust entry passage 388c is aligned with the fourth exhaust exit passage 406d; the fourth exhaust entry passage 388d is aligned with the fifth exhaust exit passage 406e; the fifth exhaust entry passage 388e is aligned with the sixth exhaust exit passage 406f; and the sixth exhaust entry passage 388f is aligned with the first exhaust exit passage 406a. So configured, in this example, the first through fourth exhaust passages 326a-326d have flow capacities of 0.5, and the fifth and sixth exhaust passages 326e, 326f have capacities of 2.0. Therefore, the total flow capacity of this arrangement is 6.0.

Figure 5C:
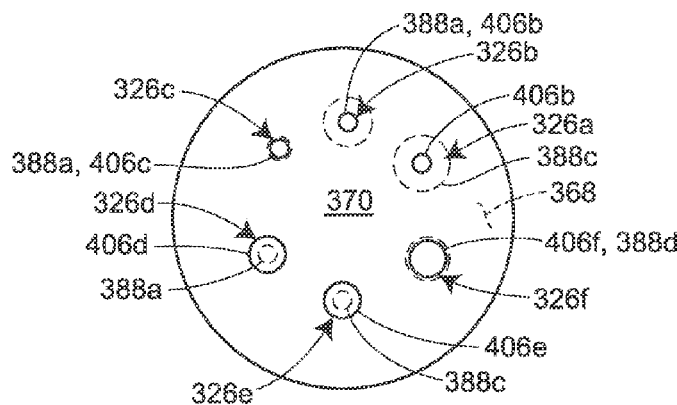

In FIG. 5C, the trim cartridge 368 has been rotated further such that the first exhaust entry passage 388a is aligned with the third exhaust exit passage 406c; the second exhaust entry passage 388b is aligned with the fourth exhaust exit passage 406d; the third exhaust entry passage 388c is aligned with the fifth exhaust exit passage 406e; the fourth exhaust entry passage 388d is aligned with the sixth exhaust exit passage 406f; the fifth exhaust entry passage 388e is aligned with the first exhaust exit passage 406a; and the sixth exhaust entry passage 388f is aligned with the second exhaust exit passage 406b. So configured, in this example, the first through fifth exhaust passages 326a-326e have flow capacities of 0.5, and only the sixth exhaust passage 326f has a capacity of 2.0. Therefore, the total flow capacity of this arrangement is 4.5.

Figure 5D:
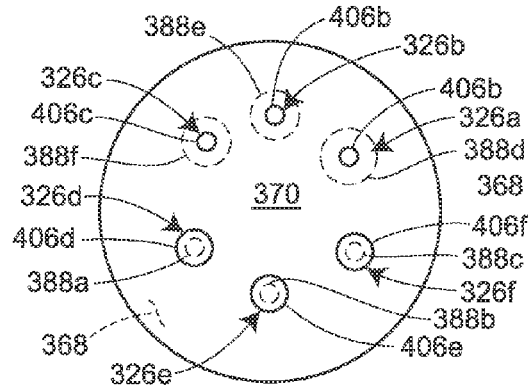

In FIG. 5D, the trim cartridge 368 has been rotated even further such that the first exhaust entry passage 388a is aligned with the fourth exhaust exit passage 406d; the second exhaust entry passage 388b is aligned with the fifth exhaust exit passage 406e; the third exhaust entry passage 388c is aligned with the sixth exhaust exit passage 406f; the fourth exhaust entry passage 388d is aligned with the first exhaust exit passage 406a; the fifth exhaust entry passage 388e is aligned with the second exhaust exit passage 406b; and the sixth exhaust entry passage 388f is aligned with the third exhaust exit passage 406c. Said another way, the first through third exhaust entry passages 388a-388c are aligned with the fourth through sixth exhaust exit passages 406d-406f, and the fourth through sixth exhaust entry passages 388d-388f are aligned with the first through third exhaust exit passages 406a-406c. So configured, in this example, each of the first through sixth exhaust passages 326a-326f have flow capacities of 0.5. Therefore, the total flow capacity of this arrangement is 3. This arrangement therefore provides for the minimum amount of volume of fluid to travel through the trim cartridge 368 and exhaust control ring 370 along the "exhaust path."

Further rotation of the disclosed embodiment of the trim cartridge 368 relative to the exhaust control ring 370 will not provide any further distinctive flow capacities, but rather, will only produce flow capacities identical to one of the four already described.

As mentioned above, the trim cartridge 368 and the exhaust control ring 370 are secured within the volume booster 244 depicted in FIG. 3 via the plurality of fasteners 378. Therefore, to rotate the trim cartridge 368 between the various positions to produce the different flow capacities, the fasteners 378 must first be loosened and removed, at least to the extent that they no longer interfere with the free rotation of the trim cartridge 368. As the trim cartridge 368 only includes the six (6) bolt holes 384 described above, the fasteners 378 will only be able to be re-secured if these bolt holes 384 are aligned with the bolt holes 408 in the exhaust control ring 370.

In one embodiment of the volume booster 244, the trim cartridge 368 can further include one or more indicators, which are identified by reference numerals 418 in FIG. 4, and the exhaust control ring 370 can include a target, which is identified by reference numeral 420 in FIG. 4. Because the present embodiment of the trim cartridge 368 can effectively be rotated between six (6) different positions to define four (4) distinct flow capacities, the cartridge 368 can include six (6) indicators 418, only three of which can be seen in the view provided in FIG. 4. The indicators 418 are fixed to the trim cartridge 368 such that one is aligned with the target 420 on the exhaust control ring 370 in each of the six positions, thereby indicating to a user or a technician which position the trim cartridge 368 occupies. The indicators 418 may also include information indicating to the user or technician the exact flow capacity provided by the specific position of the trim cartridge 368. This advantageously allows the trim cartridge 368 to be easily adjusted from one position to another by way of viewing the indicators 418 in relation to the target 420.

While the trim cartridge 368 and exhaust control ring 370 have been described herein as being configured such that the trim cartridge 368 can be adjusted between six (6) different positions to define four (4) distinct flow capacities, alternative embodiments of the volume booster 244 can advantageously be designed to have a trim cartridge 368 adjustable between generally any number of positions to define generally any number of different flow capacities.

As mentioned above, one distinct feature of the volume booster 244 depicted in FIG. 3 is the seat ring 360 carried by the diaphragm assembly 334, which advantageously increases the stability of the volume booster 244. Specifically, as illustrated in FIG. 3, the outer cylindrical member 364 of the seat ring 360 is positioned into the central opening of the exhaust control ring 370 when the diaphragm assembly 334 is seated against the exhaust valve 350. This effectively separates the exhaust chamber section 328 of the cavity 324 into an exhaust sub-section 328a and a registration sub-section 328b. The exhaust sub-section 328a is disposed around the exhaust valve 350 and inside of the seat ring 360, while the registration sub-section 328b is disposed outside of the seat ring 360. So configured, the registration sub-section 328b is substantially solely in fluid communication with the registration passages 329, and the exhaust sub-section 328a is substantially solely in fluid communication with the exhaust passages 326. Therefore, the lower diaphragm 340 of the diaphragm assembly 334 is shielded from exhaust fluid flowing from the exhaust passages 326, which can cause turbulence under high velocity conditions and de-stabilize the operation of the booster 244. The design of the seat ring 360 therefore increases the stability of the volume booster 244.

While the volume boosters 44, 244 of the present application have been described as being used in conjunction with a single-acting diaphragm actuator system, as depicted FIG. 1, it should be appreciated that they could also be utilized in a double-acting piston actuator system 500, as depicted in FIG. 5.

The double-acting piston actuator assembly 500 comprises a piston-based actuator 512, a positioner 514, first and second volume boosters 516a, 516b, a regulator 518, and a controller 520. The various components are connected together via a plurality of fluid lines. For example, the regulator 518 provides a pressurized supply to the positioner 514 and the volume boosters 516a, 516b via a supply line L1. Based on an electrical signal received from the controller 520, the positioner 514 delivers a pneumatic signal to each of the volume boosters 516a, 516b via first and second output signal lines L2', L2". Finally, the volume boosters 516a, 516b deliver control pressure to the actuator 512 via two control lines L3', L3".

The actuator 512 includes a casing 513 containing a piston 515. The piston 515 is movable within the casing 513 based on the pressures received from the volume boosters 516a, 516b. For example, when the first volume booster 516a introduces a pressure into the casing 513 that is larger than a pressure introduced by the second volume booster 516b, the piston 515 moves downward. As the piston moves downward, fluid stored in the casing 513 below the piston 515 exhausts through the second volume booster 516b. When the fluid exhausts through the volume booster 516b, fluid flows along the "exhaust path" described above with reference to the volume booster 44 depicted in FIG. 2. The exhausting process is the same whether the volume booster 44 depicted in FIG. 2 or the second volume booster 244 depicted in FIG. 3 is used for the second volume booster 516b.

Similarly, when the second volume booster 516b introduces a pressure into the casing 513 that is larger than a pressure introduced by the first volume booster 516a, the piston 515 moves upward. Therefore, as the piston moves upward, fluid stored in the casing 513 above the piston 515 exhausts through the first volume booster 516a. Fluid exhausts through the first volume booster 516a in a manner identical to how it exhausts through the second volume booster 516b. Again, the exhausting process is the same whether the volume booster 44 depicted in FIG. 2 or the volume booster 244 depicted in FIG. 3 is used for the first volume booster 516a.

Such a double-acting actuator assembly 500 operates optimally when the supply capacity of the volume boosters 516a, 516b is slightly greater than the exhaust capacities, which also means that the exhaust resistances are slightly greater than the supply resistances. This is because the casing 513 of the actuator 512 is preferably maintained under a constant positive pressure, which keeps the piston 515 "stiff." A "stiff" piston 515 optimizes the stability of the actuator 512 by protecting the piston 515 against influence from external factors such as feedback from the corresponding control valve. When the supply and exhaust capacities are set too close to each other, the pressure within the casing of the actuator 512 will slightly decay upon each stroke of the piston 515. The reduced exhaust capacity therefore counteracts this decay.

Thus, in the case where each of the volume boosters 516a, 516b include the volume booster 44 depicted in FIG. 2, one or more of the radial passages 144 can be sealed with a plug 161. In the case where each of the volume boosters 516a, 516b include the volume booster 244 depicted in FIG. 3, the trim cartridge 368 can be adjusted to an appropriate position to reduce the exhaust capacity below the supply capacity.

Figure 6:
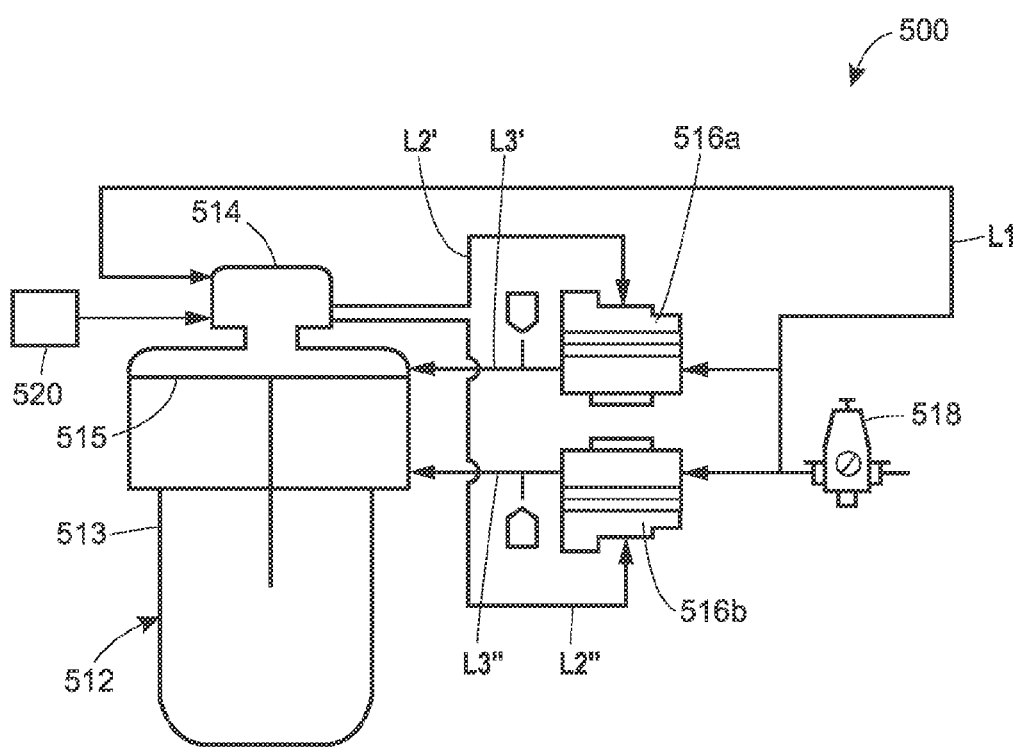
FIG. 6 is a schematic representation of a double-acting piston actuator assembly including two volume boosters constructed in accordance with the present disclosure.

Thus, it should further be appreciated that the volume boosters 44, 244 described herein advantageously enable the same volume booster, whether it be the volume booster 44 depicted in FIG. 2 or the volume booster 244 depicted in FIG. 3, to be used in single-acting actuator assemblies 10 (FIG. 1) or double-acting actuator assemblies 500 (FIG. 6) without sacrificing performance. The adjustment between the various applications is easily made by manipulating the restrictors 161 in the volume booster 44, e.g., adding or removing one or more restrictors 161, or manipulating, e.g., adjusting, the trim cartridge 368 of the volume booster 244.

In light of the foregoing, it should be appreciated that the volume boosters 16, 116 described herein are merely examples of fluid control devices incorporating the principles of the present disclosure. Other fluid control devices may also benefit from the structures and/or advantages of the present disclosure without departing from the spirit and scope of the attached claims and the following "aspects".

Aspect 1: A fluid flow control device, comprising: a body comprising an inlet port, a common port, and a discharge port; a supply path extending between the inlet port and the common port; an exhaust path extending between the common port and the discharge port; a supply port disposed within the body along the supply path between the inlet port and the common port; a control element disposed within the body and adapted for displacement between a closed position in sealing engagement with the supply port to close the supply path, and an open position spaced from the supply port to open the supply path; a diaphragm assembly defining an exhaust port disposed along the exhaust path between the common port and the discharge port, the diaphragm assembly adapted for displacement between a closed position, wherein the exhaust port is in sealing engagement with the control element to close the exhaust path, and an open position, wherein the exhaust port is spaced from the control element to open the exhaust path; and at least one restrictor disposed within the body for restricting the flow of fluid along the exhaust path when the exhaust port is spaced from the control element, the at least one restrictor selectively manipulable between a plurality of positions relative to the body to define a plurality of distinct exhaust capacities for the exhaust path.

Aspect 2: The device of aspect 1, wherein the diaphragm assembly comprises a manifold having a plurality of radial passages disposed along the exhaust path, and wherein the at least one restrictor comprises at least one plug removably disposed in at least one of the plurality of radial passages in the manifold.

Aspect 3: The device of any one of the preceding aspects, wherein the at least one restrictor comprises a trim cartridge disposed within the body along the exhaust path and displaceable between a plurality of positions to define the plurality of distinct exhaust capacities.

Aspect 4: The device of any one of the preceding aspects, wherein the trim cartridge is rotatable between a plurality of positions to define the plurality of distinct exhaust capacities.

Aspect 5: The device of any one of the preceding aspects, wherein the trim cartridge comprises a plurality of exhaust entry passages of varying dimension in fluid communication with a plurality of exhaust delivery passages of varying dimension carried by the body, such that the exhaust capacity for each of the plurality of positions of the trim cartridge depends on the specific alignment of the plurality of exhaust entry passages in the trim cartridge with the plurality of exhaust delivery passages carried by the body.

Aspect 6: The device of any one of the preceding aspects, wherein each of the plurality of exhaust entry passages in the trim cartridge comprises a cylindrical bore.

Aspect 7: The device of any one of the preceding aspects, wherein half of the plurality of exhaust entry passages in the trim cartridge comprise a first diameter and half of the plurality of exhaust entry passages comprise a second diameter that is different than the first diameter.

Aspect 8: The device of any one of the preceding aspects, wherein half of the plurality of exhaust delivery passages carried by the body comprise a third diameter and half of the plurality of exhaust delivery passages comprise a fourth diameter that is different than the third diameter.

Aspect 9: The device of any one of the preceding aspects, further comprising an indicator indicating the position of the restrictor.

Aspect 10: A fluid flow control device, comprising: a body comprising an inlet port, a common port, and a discharge port; a supply path extending between the inlet port and the common port; an exhaust path extending between the common port and the discharge port; a supply port disposed within the body along the supply path between the inlet port and the common port; a control element disposed within the body and adapted for displacement between a closed position in sealing engagement with the supply port to close the supply path, and an open position spaced from the supply port to open the supply path; and a trim cartridge disposed within the body and defining a plurality of exhaust entry passages for directing the flow of fluid along the exhaust path when the exhaust port is spaced from the control element, the trim cartridge rotatable between a plurality of positions within the body to define a plurality of distinct exhaust capacities for the exhaust path.

Aspect 11: The device of aspect 10, wherein each of the plurality of exhaust entry passages in the trim cartridge comprises a cylindrical bore.

Aspect 12: The device of any one of aspects 10 to 11, wherein the plurality of exhaust entry passages in the trim cartridge are of varying dimension.

Aspect 13: The device of any one of aspects 10 to 12, further comprising a plurality of exhaust delivery passages of varying dimension disposed within the body and in fluid communication with the plurality of exhaust entry passages, such that the exhaust capacity for each of the plurality of positions of the trim cartridge depends on the specific alignment of the plurality of exhaust entry passages in the trim cartridge with the plurality of exhaust delivery passages.

Aspect 14: The device of any one of aspects 10 to 13, wherein half of the plurality of exhaust entry passages comprise a first diameter and half of the plurality of exhaust entry passages comprise a second diameter that is different than the first diameter.

Aspect 15: The device of any one of aspects 10 to 14, wherein half of the plurality of exhaust delivery passages comprise a third diameter and half of the plurality of exhaust delivery passages comprise a fourth diameter that is different that the third diameter.

Aspect 16: The device of any one of aspects 10 to 15, further comprising an indicator indicating the position of the trim cartridge within the body.

Aspect 17: The device of any one of aspects 10 to 16, further comprising a diaphragm assembly defining an exhaust port disposed along the exhaust path between the common port and the discharge port, the diaphragm assembly adapted for displacement between a closed position, wherein the exhaust port is in sealing engagement with the control element to close the exhaust path, and an open position, wherein the exhaust port is spaced from the control element to open the exhaust path.

Aspect 18: A fluid flow control device, comprising: a body comprising an inlet port, a common port, a discharge port; a plurality of exhaust delivery passages disposed within the body and providing for fluid communication between the common port and the discharge port; a supply path extending between the inlet port and the common port; an exhaust path extending along the plurality of exhaust delivery passages between the common port and the discharge port; and a trim cartridge rotatably disposed within the body and defining a plurality of exhaust passages, each of the plurality of exhaust passages in the trim cartridge in fluid communication with one of the plurality of exhaust delivery passages, the plurality of exhaust delivery passages and exhaust entry passages varying in dimension such that the exhaust capacity of the exhaust flow path can be adjusted between a plurality of distinct exhaust capacities by rotating the trim cartridge between a plurality of positions relative to the body.

Aspect 19: The device of aspect 18, wherein each of the plurality of exhaust delivery passages and exhaust entry passages comprises a cylindrical bore.

Aspect 20: The device of any one of aspects 18 to 19, wherein half of the plurality of exhaust entry passages in the trim cartridge comprise a first diameter and half of the plurality of exhaust entry passages comprise a second diameter that is different than the first diameter.

Aspect 21: The device of any one of aspects 18 to 20, wherein half of the plurality of exhaust delivery passages in the body comprise a third diameter and half of the plurality of exhaust delivery passages comprise a fourth diameter that is different than the third diameter.

Aspect 22: The device of any one of aspects 18 to 21, further comprising an indicator indicating the position of the trim cartridge relative to the body.

Aspect 23: The device of any one of aspects 18 to 22, further comprising: a supply port disposed within the body along the supply path between the inlet port and the common port; and a control element disposed within the body and adapted for displacement between a closed position in sealing engagement with the supply port to close the supply path, and an open position spaced from the supply port to open the supply path.

Aspect 24: The device of any one of aspects 18 to 23, further comprising a diaphragm assembly defining an exhaust port disposed along the exhaust path between the common port and the discharge port, the diaphragm assembly adapted for displacement between a closed position, wherein the exhaust port is in sealing engagement with the control element to close the exhaust path, and an open position, wherein the exhaust port is spaced from the control element to open the exhaust path.

Aspect 25: A fluid flow control device, comprising: a body comprising an inlet port, a common port, and a discharge port; a supply path extending between the inlet port and the common port; an exhaust path extending between the common port and the discharge port; a supply port disposed within the body along the supply path between the inlet port and the common port; a control element disposed within the body and adapted for displacement between a closed position in sealing engagement with the supply port to close the supply path, and an open position spaced from the supply port to open the supply path; a diaphragm assembly comprising a manifold and a diaphragm, the manifold having a plurality of radial passages and an exhaust port disposed along the exhaust path between the common port and the discharge port, the manifold adapted for displacement between a closed position, wherein the exhaust port is in sealing engagement with the control element to close the exhaust path, and an open position, wherein the exhaust port is spaced from the control element to open the exhaust path; and at least one plug adapted to be selectively and removably disposed in at least one of the plurality of radial passages in the manifold to reduce a fluid flow capacity of the exhaust path.

What is claimed:

1. A fluid flow control device, comprising:
a body comprising an inlet port, a common port, and a discharge port;
a supply path extending between the inlet port and the common port;
an exhaust path extending between the common port and the discharge port;
a supply port disposed within the body along the supply path between the inlet port and the common port;
a control element comprising a supply valve, an exhaust valve, and a stem extending between the supply and exhaust valves, the control element disposed within the body and adapted for displacement between a closed position where the supply valve is in sealing engagement with the supply port to close the supply path, and an open position where the supply valve is spaced from the supply port to open the supply path;
a diaphragm assembly defining an exhaust port disposed along the exhaust path between the common port and the discharge port, the diaphragm assembly adapted for displacement between a closed position, wherein the exhaust port is in sealing engagement with the exhaust valve of the control element to close the exhaust path, and an open position, wherein the exhaust port is spaced from the exhaust valve of the control element to open the exhaust path; and
at least one restrictor disposed within the body for restricting the flow of fluid along the exhaust path when the exhaust port is spaced from the control element, the at least one restrictor comprising a disc-shaped trim cartridge and a disc-shaped exhaust control ring stacked on top of the trim cartridge, the trim cartridge selectively manipulable between a plurality of positions relative to the exhaust control ring to define a plurality of distinct exhaust capacities for the exhaust path.

2. The device of claim 1, wherein the trim cartridge is rotatable between a plurality of positions to define the plurality of distinct exhaust capacities.

3. The device of claim 2, wherein the trim cartridge comprises a plurality of exhaust entry passages of varying dimension in fluid communication with a plurality of exhaust delivery passages of varying dimension carried by the exhaust control ring, such that the exhaust capacity for each of the plurality of positions of the trim cartridge depends on the specific alignment of the plurality of exhaust entry passages in the trim cartridge with the plurality of exhaust delivery passages carried by the exhaust control ring.

4. The device of claim 3, wherein each of the plurality of exhaust entry passages in the trim cartridge comprises a cylindrical bore.

5. The device of claim 4, wherein half of the plurality of exhaust entry passages in the trim cartridge comprise a first diameter and half of the plurality of exhaust entry passages comprise a second diameter that is different than the first diameter.

6. The device of claim 5, wherein half of the plurality of exhaust delivery passages carried by the exhaust control ring comprise a third diameter and half of the plurality of exhaust delivery passages comprise a fourth diameter that is different than the third diameter.

7. The device of claim 1, further comprising an indicator indicating a position of the restrictor.

8. The device of claim 1, further comprising:
a seat ring having an inner cylindrical member, an outer cylindrical member, and a radial member extending between the inner and outer cylindrical members; wherein
the inner cylindrical member is fixed to the diaphragm assembly and defines the exhaust port;
the radial member defines a seat for engaging the exhaust valve; and the outer cylindrical member extends away from the diaphragm assembly and around the exhaust valve, is positioned in a central opening formed in the exhaust control ring, and prevents fluid exhausted from the exhaust control ring from engaging a lower diaphragm of the diaphragm assembly.

9. A fluid flow control device, comprising:
a body comprising an inlet port, a common port, and a discharge port;
a supply path extending between the inlet port and the common port;
an exhaust path extending between the common port and the discharge port;
a supply port disposed within the body along the supply path between the inlet port and the common port;
a control element comprising a supply valve, an exhaust valve, and a stem extending between the supply and exhaust valves, the control element disposed within the body and adapted for displacement between a closed position where the supply valve is in sealing engagement with the supply port to close the supply path, and an open position where the supply valve is spaced from the supply port to open the supply path; and
a disc-shaped trim cartridge disposed within the body and defining a plurality of parallel exhaust entry passages for directing the flow of fluid along the exhaust path when the exhaust port is spaced from the control element, the disc-shaped trim cartridge rotatable between a plurality of positions within the body to define a plurality of distinct exhaust capacities for the exhaust path.

10. The device of claim 9, wherein each of the plurality of exhaust entry passages in the trim cartridge comprises a cylindrical bore.

11. The device of claim 9, wherein the plurality of exhaust entry passages in the trim cartridge are of varying dimension.

12. The device of claim 11, further comprising a plurality of parallel exhaust delivery passages of varying dimension disposed within a disc-shaped exhaust control ring stacked on top of the disc-shaped trim cartridge, the plurality of exhaust delivery passages in fluid communication with the plurality of exhaust entry passages, such that the exhaust capacity for each of the plurality of positions of the trim cartridge depends on a specific alignment of the plurality of exhaust entry passages in the trim cartridge with the plurality of exhaust delivery passages.

13. The device of claim 12, wherein half of the plurality of exhaust entry passages comprise a first diameter and half of the plurality of exhaust entry passages comprise a second diameter that is different than the first diameter.

14. The device of claim 13, wherein half of the plurality of exhaust delivery passages comprise a third diameter and half of the plurality of exhaust delivery passages comprise a fourth diameter that is different that the third diameter.

15. The device of claim 9, further comprising an indicator indicating a position of the trim cartridge within the body.

16. The device of claim 9, further comprising a diaphragm assembly defining an exhaust port disposed along the exhaust path between the common port and the discharge port, the diaphragm assembly adapted for displacement between a closed position, wherein the exhaust port is in sealing engagement with the exhaust valve of the control element to close the exhaust path, and an open position, wherein the exhaust port is spaced from the exhaust valve of the control element to open the exhaust path.

17. The device of claim 9, further comprising:
a diaphragm assembly defining an exhaust port disposed along the exhaust path between the common port and the discharge port, the diaphragm assembly adapted for displacement between a closed position, wherein the exhaust port is in sealing engagement with the exhaust valve of the control element to close the exhaust path, and an open position, wherein the exhaust port is spaced from the exhaust valve of the control element to open the exhaust path; and
a seat ring having an inner cylindrical member, an outer cylindrical member, and a radial member extending between the inner and outer cylindrical members; wherein
the inner cylindrical member is fixed to the diaphragm assembly and defines the exhaust port;
the radial member defines a seat for engaging the exhaust valve; and
the outer cylindrical member extends away from the diaphragm assembly and around the exhaust valve and prevents fluid exhausted from the trim cartridge from engaging a lower diaphragm of the diaphragm assembly.

18. A fluid flow control device, comprising:
a body comprising an inlet port, a common port, a discharge port;
a plurality of exhaust delivery passages disposed within the body and providing for fluid communication between the common port and the discharge port;
a supply path extending between the inlet port and the common port;
an exhaust path extending along the plurality of exhaust delivery passages between the common port and the discharge port; and
a disc-shaped trim cartridge rotatably disposed within the body and defining a plurality of parallel exhaust entry passages, each of the plurality of exhaust entry passages in the trim cartridge in fluid communication with one of the plurality of exhaust delivery passages,
the plurality of exhaust delivery passages and exhaust entry passages varying in dimension such that the exhaust capacity of the exhaust flow path can be adjusted between a plurality of distinct exhaust capacities by rotating the trim cartridge between a plurality of positions relative to the body.

19. The device of claim 18, wherein each of the plurality of exhaust delivery passages and exhaust entry passages comprises a cylindrical bore.

20. The device of claim 18, wherein half of the plurality of exhaust entry passages in the trim cartridge comprise a first diameter and half of the plurality of exhaust entry passages comprise a second diameter that is different than the first diameter.

21. The device of claim 20, wherein half of the plurality of exhaust delivery passages in the body comprise a third diameter and half of the plurality of exhaust delivery passages comprise a fourth diameter that is different than the third diameter.

22. The device of claim 18, further comprising an indicator indicating a position of the trim cartridge relative to the body.

23. The device of claim 18, further comprising:
a supply port disposed within the body along the supply path between the inlet port and the common port; and
a control element comprising a supply valve, an exhaust valve, and a stem extending between the supply and exhaust valve, the control element disposed within the body and adapted for displacement between a closed position where the supply valve is in sealing engagement with the supply port to close the supply path, and an open position where the supply valve is spaced from the supply port to open the supply path.

24. The device of claim 23, further comprising a diaphragm assembly defining an exhaust port disposed along the exhaust path between the common port and the discharge port, the diaphragm assembly adapted for displacement between a closed position, wherein the exhaust port is in sealing engagement with the exhaust valve of the control element to close the exhaust path, and an open position, wherein the exhaust port is spaced from the exhaust valve of the control element to open the exhaust path.

25. The device of claim 18, further comprising:
- a diaphragm assembly defining an exhaust port disposed along the exhaust path between the common port and the discharge port, the diaphragm assembly adapted for displacement between a closed position, wherein the exhaust port is in sealing engagement with an exhaust valve of a control element to close the exhaust path, and an open position, wherein the exhaust port is spaced from the exhaust valve of the control element to open the exhaust path; and
- a seat ring having an inner cylindrical member, an outer cylindrical member, and a radial member extending between the inner and outer cylindrical members; wherein
- the inner cylindrical member is fixed to the diaphragm assembly and defines the exhaust port;
- the radial member defines a seat for engaging the exhaust valve; and
- the outer cylindrical member extends away from the diaphragm assembly and around the exhaust valve and prevents fluid exhausted from the exhaust delivery passages from engaging a lower diaphragm of the diaphragm assembly.

* * * * *

UNITED STATES PATENT AND TRADEMARK OFFICE
CERTIFICATE OF CORRECTION

PATENT NO. : 9,074,695 B2
APPLICATION NO. : 13/209696
DATED : July 7, 2015
INVENTOR(S) : Michel K. Lovell et al.

Page 1 of 1

It is certified that error appears in the above-identified patent and that said Letters Patent is hereby corrected as shown below:

<u>In the Specification:</u>

At Column 1, line 13, "present" should be -- The present --.

At Column 2, line 52, "port 146." should be -- port 148. --.

At Column 6, line 21, "seat 102" should be -- seat 120 --.

At Column 10, line 29, "fasteners 328" should be -- fasteners 378 --.

At Column 11, line 25, "component 368" should be -- cartridge 368 --.

At Column 13, line 3, "holes 408" should be -- holes 412 --.

At Column 16, line 43, "that" should be -- than --.

<u>In the Claims:</u>

At Column 19, line 53, "that" should be -- than --.

Signed and Sealed this
Twenty-ninth Day of March, 2016

Michelle K. Lee
*Director of the United States Patent and Trademark Office*